(12) United States Patent
Lu et al.

(10) Patent No.: US 12,546,111 B2
(45) Date of Patent: Feb. 10, 2026

(54) HIGH SOLIDS COLOR FACE AND EDGE COATINGS FOR BUILDING PANELS

(71) Applicant: ARMSTRONG WORLD INDUSTRIES, INC., Lancaster, PA (US)

(72) Inventors: Lida Lu, Coraopolis, PA (US); Kenneth G. Caldwell, Mountville, PA (US); Michelle X. Wang, Lititz, PA (US); John E. Hughes, Lincoln University, PA (US)

(73) Assignee: AWI Licensing LLC, Wilmington, DE (US)

( * ) Notice: Subject to any disclaimer, the term of this patent is extended or adjusted under 35 U.S.C. 154(b) by 8 days.

(21) Appl. No.: 18/108,597

(22) Filed: Feb. 11, 2023

(65) Prior Publication Data
US 2023/0183974 A1    Jun. 15, 2023

Related U.S. Application Data

(62) Division of application No. 15/647,432, filed on Jul. 12, 2017, now Pat. No. 11,598,095.

(Continued)

(51) Int. Cl.
| | |
|---|---|
| *E04C 2/16* | (2006.01) |
| *C09D 7/40* | (2018.01) |
| *C09D 7/61* | (2018.01) |
| *C09D 201/02* | (2006.01) |
| *E04C 2/24* | (2006.01) |

(52) U.S. Cl.
CPC ............... *E04C 2/16* (2013.01); *C09D 7/61* (2018.01); *C09D 7/66* (2018.01); *C09D 201/02* (2013.01); *E04C 2/246* (2013.01); *B32B 2607/00* (2013.01)

(58) Field of Classification Search
CPC ....... B32B 2607/00; E04C 2/16; E04C 2/246; C04B 211/0062; Y10T 442/172; Y10T 442/174; Y10T 442/098; Y10T 442/665; C09D 1/00; C09D 5/04; C09D 5/028; C09D 7/45; C09D 7/61; C09D 7/70; C09D 201/02; C09D 201/66; C09D 201/69
See application file for complete search history.

(56) References Cited

U.S. PATENT DOCUMENTS

| 4,559,377 A | 12/1985 | Gleason |
|---|---|---|
| 4,778,544 A | 10/1988 | Jones |

(Continued)

FOREIGN PATENT DOCUMENTS

| CN | 1315975 A | 10/2001 |
|---|---|---|
| CN | 1346858 A | 5/2002 |

(Continued)

OTHER PUBLICATIONS

Espacenet Translation of JP-2008208708-A. (Year: 2008).*

*Primary Examiner* — Marla D Mcconnell
*Assistant Examiner* — Christine X Nisula
(74) *Attorney, Agent, or Firm* — Patrick Sheldrake

(57) ABSTRACT

Described herein is a coated building panel having a body and a surface coating atop the body, the surface coating comprising inorganic pigment and a polymeric dispersant comprising a polymer backbone and pendant side chains extending from the polymer backbone; wherein the surface coating comprises a liquid carrier in an amount less than about 1 wt. % based on the total weight of the surface coating.

17 Claims, 6 Drawing Sheets

Related U.S. Application Data

(60) Provisional application No. 62/361,147, filed on Jul. 12, 2016.

(56) References Cited

U.S. PATENT DOCUMENTS

| | | |
|---|---|---|
| 5,786,436 A | 7/1998 | Fischer |
| 5,814,144 A * | 9/1998 | Coutts .................. C09D 17/001 |
| | | 106/311 |
| 6,077,593 A | 6/2000 | Schlachter |
| 6,344,434 B1 | 2/2002 | Matsuo |
| 6,376,597 B1 | 4/2002 | Coca |
| 6,406,779 B1 * | 6/2002 | Carbo .................. C04B 41/009 |
| | | 428/311.11 |
| 6,736,936 B1 | 5/2004 | Weston |
| 6,749,920 B1 | 6/2004 | Caldwell |
| 7,476,430 B2 | 1/2009 | Houck |
| 2002/0064633 A1 | 5/2002 | Wakata |
| 2003/0017271 A1 | 1/2003 | Sikkar |
| 2003/0113572 A1 | 6/2003 | Deodhar |
| 2004/0048531 A1 | 3/2004 | Belmares |
| 2004/0062898 A1 | 4/2004 | Felegi |
| 2007/0197114 A1 | 8/2007 | Grove |
| 2008/0210394 A1 | 9/2008 | Mahr |
| 2009/0004468 A1 * | 1/2009 | Chen .................. C04B 41/483 |
| | | 524/451 |
| 2009/0011251 A1 | 1/2009 | Englert |
| 2011/0319543 A1 | 12/2011 | Carbo |
| 2012/0022181 A1 | 1/2012 | Xu |
| 2013/0102729 A1 | 4/2013 | Li |
| 2015/0308111 A1 | 10/2015 | Kemp |
| 2015/0330072 A1 | 11/2015 | Kragness |
| 2016/0257837 A1 * | 9/2016 | Zhang .................. C08K 5/05 |
| 2017/0022384 A1 * | 1/2017 | Jankolovits .......... C09D 17/001 |

FOREIGN PATENT DOCUMENTS

| | | |
|---|---|---|
| CN | 101208397 A | 6/2008 |
| CN | 102471632 A | 5/2012 |
| CN | 104245858 A | 12/2014 |
| EP | 0761776 A2 | 3/1997 |
| EP | 1228812 A1 | 8/2002 |
| JP | 2008208708 A * | 9/2008 |
| RU | 67509 U1 | 10/2007 |
| WO | WO 2012/012223 A2 | 1/2012 |
| WO | WO 2015/166260 A1 | 11/2015 |

* cited by examiner

HIGH SOLIDS COLOR FACE AND EDGE COATINGS FOR BUILDING PANELS

CROSS-REFERENCE TO RELATED APPLICATIONS

This application is a divisional of U.S. patent application Ser. No. 15/647,432, filed on Jul. 12, 2017, which claims the benefit of U.S. Provisional Application No. 62/361,147, filed on Jul. 12, 2016. The disclosures of the foregoing applications are incorporated herein by reference in their entireties.

BACKGROUND

Ceiling systems are installed into room environments to help control noise as well as enhance the aesthetic appeal of those room environments. These ceiling systems may comprise one or more building panels having specific aesthetic properties that help contribute to the appeal of the room environment. Previous attempts at improving the aesthetic properties of these building panels included applying decorative coatings to the surface of the building panel. However, such decorative coatings tend to create difficulties associated with manufacturing time as well as the overall performance of the building panel at high-temperatures (i.e., increased flammability and/or blistering of the coating). Thus there exists a need for building panels comprising a decorative coating applied thereto that does not create the same difficulties with respect to manufacturing and while also not sacrificing the required aesthetic properties provided by the decorative coating

BRIEF SUMMARY

The present invention is directed to a coated building panel comprising: a body comprising an upper surface opposite a lower surface and a side surface extending between the upper surface and the lower surface; a surface coating atop the upper surface, the surface coating comprising: inorganic pigment; and a polymeric dispersant comprising a polymer backbone and pendant side chains extending from the polymer backbone; wherein the surface coating comprises a liquid carrier in an amount less than about 1 wt. % based on the total weight of the surface coating.

In other embodiments, the present invention is directed to a method of forming a building panel having a face coating, the method comprising: a) providing a body comprising an upper surface opposite a lower surface and a side surface extending between the upper surface and the lower surface; b) applying a coating composition atop the upper surface of the body, the coating composition comprising an inorganic pigment and a polymeric dispersant comprising a polymer backbone and pendant side chains extending from the polymer backbone; and c) drying the coating composition to form the face coating; wherein the coating composition has a solid's content ranging from about 45 wt. % to about 65 wt. % based on the total weight of the coating composition.

In other embodiments, the present invention is directed to a coated building panel comprising: a body comprising an upper surface opposite a lower surface and a side surface extending between the upper surface and the lower surface; a surface coating atop the upper surface, the surface coating comprising: about 70 wt. % to about 95 wt. % of a pigment based on the total weight of the surface coating, the pigment comprising an inorganic pigment having a particle size ranging from 15 nm to 500 nm; and a polymeric dispersant comprising a polymer backbone and pendant side chains extending from the polymer backbone; wherein the surface coating comprises less than 1 wt. % of a liquid carrier based on the total weight of the surface coating.

Other embodiments of the present invention include a method of forming a building panel having an edge coating, the method comprising: a) providing a body having an upper surface opposite a lower surface and a side surface extending between the upper surface and the lower surface; b) applying a thixotropic coating composition to the side surface, the thixotropic coating composition comprising a liquid carrier, a pigment, a dispersant, and a binder having a glass transition temperature less than about 20° C.; and c) drying the thixotropic coating composition for a drying period to form the edge coating, the edge coating having less than about 1 wt. % of the liquid carrier; wherein the thixotropic coating composition has a solid's content ranging from about 50 wt. % to about 80 wt. % based on the total weight of the thixotropic coating composition.

Other embodiments of the present invention provide a coated building panel comprising: a body comprising an upper surface opposite a lower surface and a side surface extending between the upper surface and the lower surface; a thixotropic surface coating applied to the side surface, the surface coating comprising: a binder having a glass transition temperature less than about 20° C.; and pigment in an amount ranging from about 25 wt. % to about 95 wt. % based on the total weight of the surface coating, the pigment comprising inorganic pigments; a ionic dispersant; wherein the surface coating is present in an amount ranging from about 7.5 g/m$^2$ to about 150 g/m$^2$.

Other embodiments of the present invention include a coating composition comprising a liquid carrier, an inorganic pigment; and an ionic polymeric dispersant comprising a polymer backbone and pendant side chains extending from the polymer backbone, wherein the coating composition has a solid's content ranging from about 45 wt. % to about 65 wt. % based on the total weight of the coating composition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
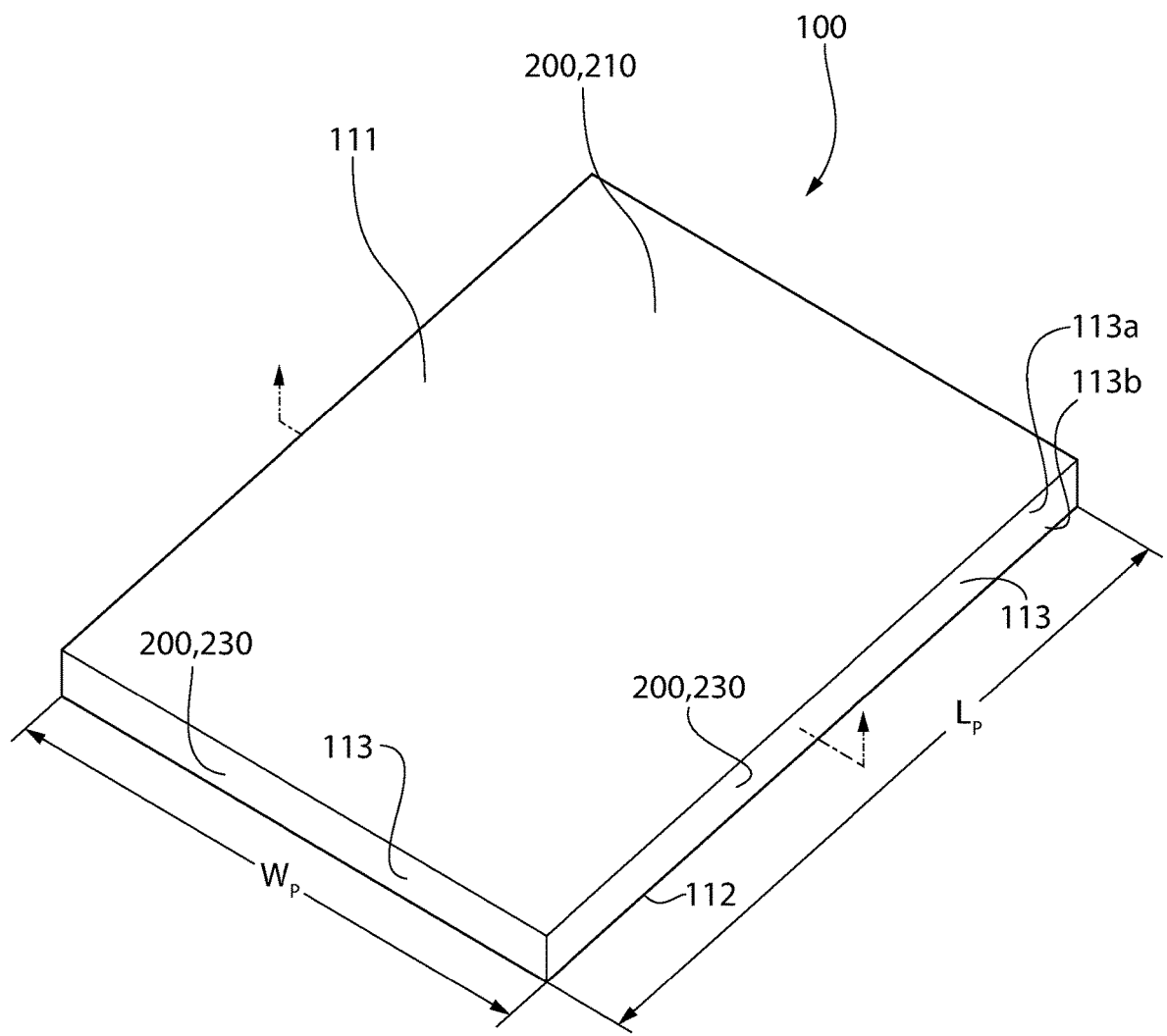
FIG. 1 is top perspective view of a coated building panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

(For Chemical Cases) Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

Figure 4:
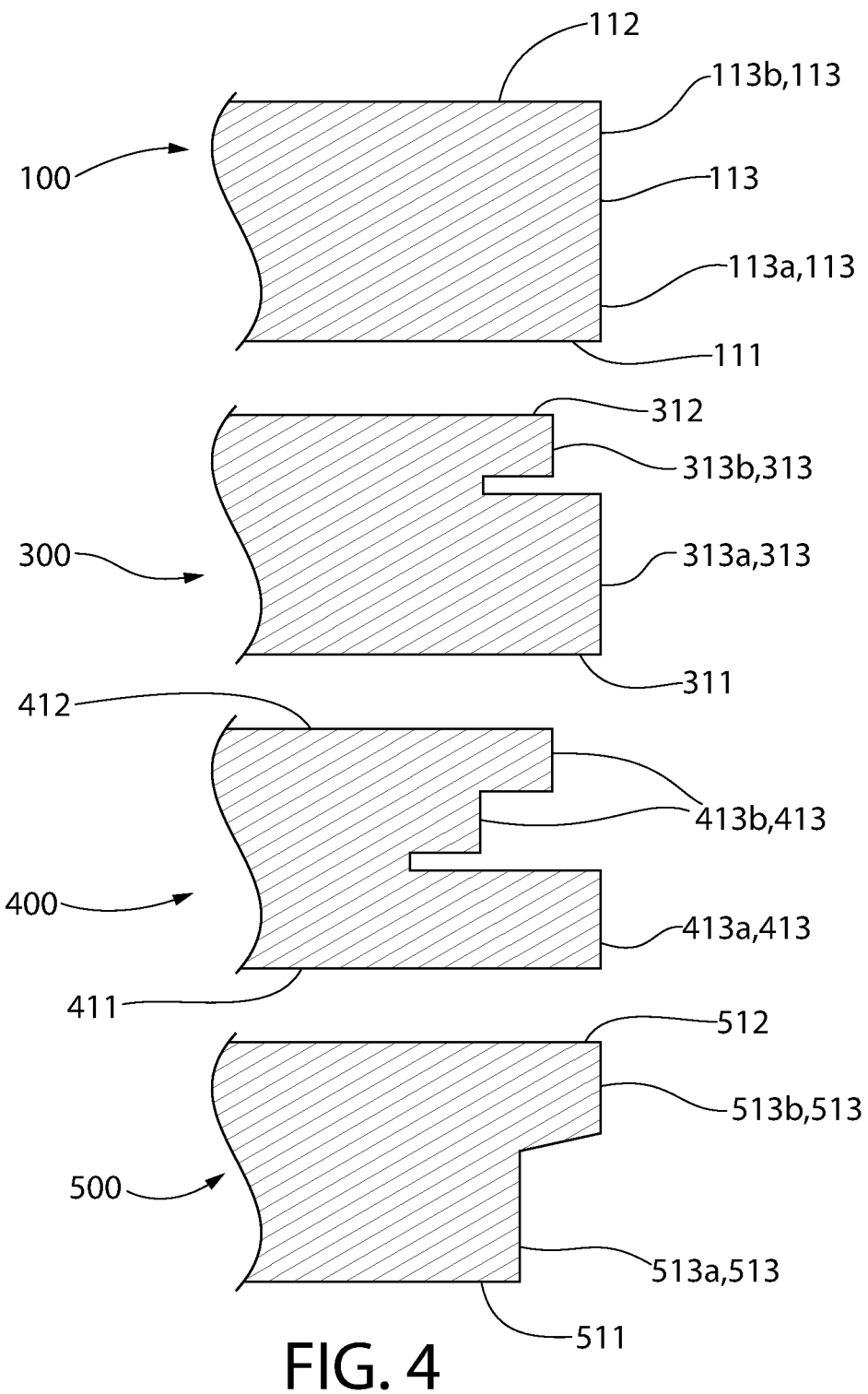
FIG. 4 is a cross-sectional close-up view of the edges of the building panels according to the present invention.

Referring to FIGS. 1 and 4, the present invention includes a coated building panel 100 (referred to herein as "building panel") comprising a first major surface 111 opposite a second major surface 112 and a side surface 113 that extends between the first major surface 111 and the second major surface 112, thereby defining a perimeter of the ceiling panel 100. The side surface 113 may comprise an upper portion 113a and a lower portion 113b, wherein the upper portion 113a is adjacent to the first major surface 111 and the lower portion 113b is adjacent to the second major surface 112.

Figure 3:
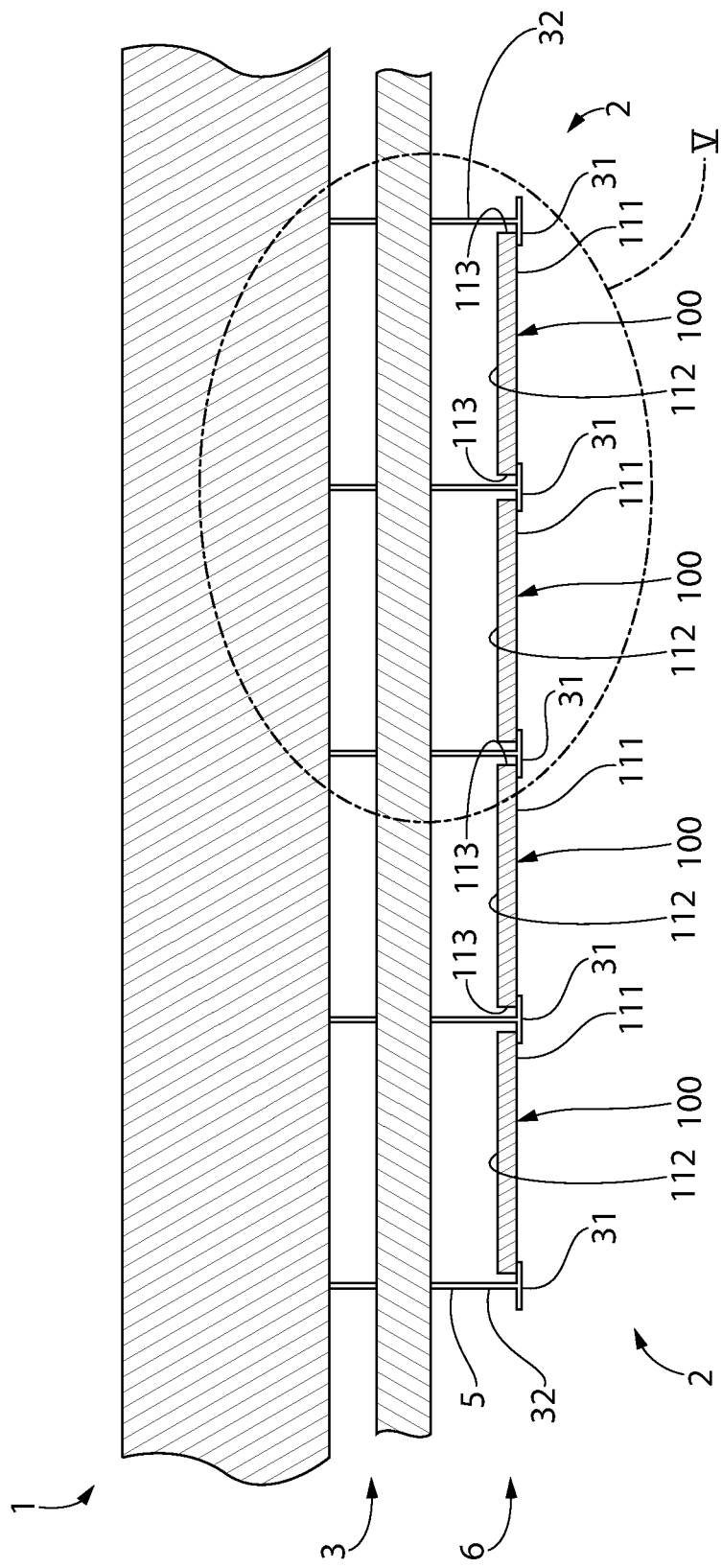
FIG. 3 is a ceiling system comprising the coated building panel of the present invention.

Referring to FIG. 3, the present invention may further include a ceiling system 1 comprising one or more of the building panels 100 installed in an interior space, whereby the interior space comprises a plenum space 3 and an active room environment 2. The plenum space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.).

In the installed state, the building panels 100 may be supported in the interior space by one or more parallel support struts 5. Each of the support struts 5 may comprise an inverted T-bar having a horizontal flange 31 and a vertical web 32. The ceiling system 1 may further comprise a plurality of first struts that are substantially parallel to each other and a plurality of second struts that are substantially perpendicular to the first struts (not pictured). In some embodiments, the plurality of second struts intersects the plurality of first struts to create an intersecting ceiling support grid 6. The plenum space 3 exists above the ceiling support grid 6 and the active room environment 2 exists below the ceiling support grid 6.

In the installed state, the first major surface 111 of the building panel 100 may face the active room environment 2 and the second major surface 112 of the building panel 100 may face the plenum space 3. The building panel 100 may be installed according to at least two variations. In a first variation, the building panel 100 is positioned entirely above the horizontal flange 31 of the support struts 5. In the first variation, at least a portion of the first major surface may be concealed from the active room environment 2 by the horizontal flange 31 because the horizontal flange 31 contacts the first major surface 111, thereby supporting it in the ceiling system 1. In the first variation, the entire side surface 113—including the upper portion 113a and the lower portion 113b—may be concealed from the active room environment 2 by the horizontal flange 311. The second variation will be described further herein.

Figure 2:
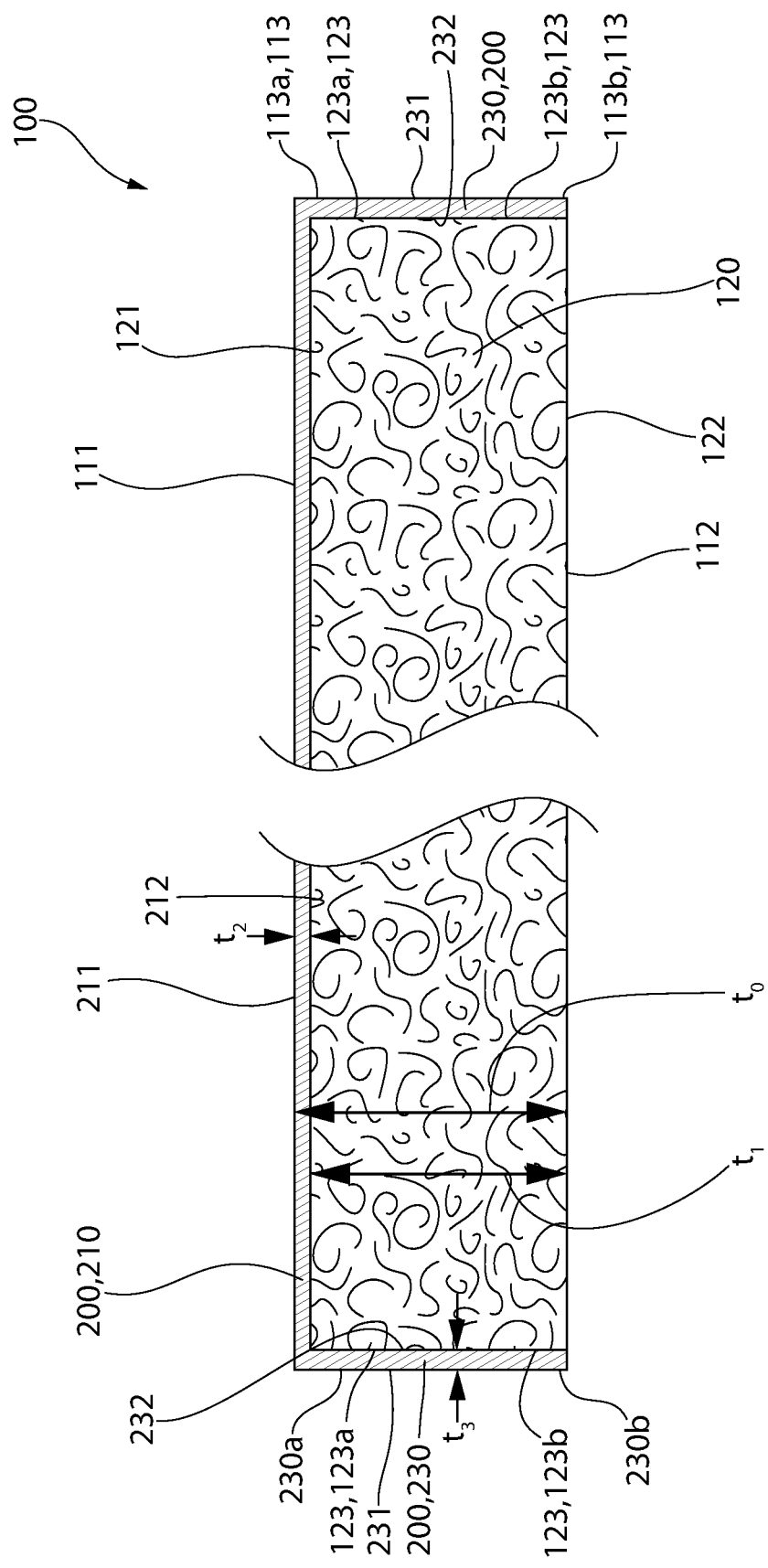
FIG. 2 is a cross-sectional view of the coated building panel according to the present invention, the cross-sectional view being along the II line set forth in FIG. 1.

Referring now to FIGS. 1 and 2, the building panel 100 of the present invention may have a panel thickness to as measured from the first major surface 111 to the second major surface 112. The panel thickness to may range from about 12 mm to about 40 mm—including all values and sub-ranges there-between. The building panel 100 may have a length $L_P$ ranging from about 30 cm to about 310 cm—including all values and sub-ranges there-between. The building panel 100 may have a width WP ranging from about 10 cm to about 125 cm—including all values and sub-ranges there-between.

The building panel 100 may comprise a body 120 and a surface coating 200 applied thereto—as discussed further herein. The body 120 comprises an upper surface 121 opposite a lower surface 122 and a body side surface 123 that extends between the upper surface 121 and the lower surface 122, thereby defining a perimeter of the body 120. The body 120 may have a body thickness $t_1$ that extends from the upper surface 121 to the lower surface 122. The body thickness $t_1$ may range from about 12 mm to about 40 mm—including all values and sub-ranges there-between.

The body 120 may be porous, thereby allowing airflow through the body 120 between the upper surface 121 and the lower surface 122—as discussed further herein. The body 120 may be comprised of a binder and fibers. In some embodiments, the body 120 may further comprise a filler and/or additive.

Non-limiting examples of binder may include a starch-based polymer, polyvinyl alcohol (PVOH), a latex, polysaccharide polymers, cellulosic polymers, protein solution polymers, an acrylic polymer, polymaleic anhydride, epoxy resins, or a combination of two or more thereof. Non-limiting examples of filler may include powders of calcium carbonate, limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate.

The fibers may be organic fibers, inorganic fibers, or a blend thereof. Non-limiting examples of inorganic fibers mineral wool (also referred to as slag wool), rock wool, stone wool, and glass fibers. Non-limiting examples of organic fiber include fiberglass, cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof.

Referring now to FIG. 2, the building panel 100 may further comprise the surface coating 200 applied to at least one of the first major surface 121 and/or the side surface 123 of the body 120. The surface coating 200 may be a color surface coating 200. According to the present invention the terms "color surface coating" and "surface coating" may be used interchangeably. The term "color surface coating" 200 refers to a surface coating 200 comprising a color pigment and the resulting surface coating 200 exhibits a color on the visible color spectrum—i.e., violet, blue, green, yellow, orange, or red. The color surface coating 200 may also have a color of white, black, or grey. The color surface coating 200 may further comprise combinations of two or more colors—such a primary color (i.e., red, yellow, blue) as well as an achromatic color (i.e., white, grey).

A non-limiting example of a color surface coating 200 may be pink and produced from a combination of red and white pigments. Another non-limiting example of a color surface coating 200 may be green and produced from a combination of blue and yellow pigments. Another non-limiting example of a color surface coating 200 may be brown and produced from a combination of red, yellow, and black pigments.

In some embodiments, the surface coating 200 may include a face coating 210 that applied to the first major surface 121 of the body 120. In other embodiments, the surface coating 200 may include an edge coating 230 that is applied to the side surface 123 of the body 120. In other embodiments, the building panel 100 may comprise both the face coating 210 applied to the first major surface 121 of the body 120 as well as the edge coating 230 applied to the side surface 123 of the body 120.

The face coating 210 may comprise an upper surface 211 opposite a lower surface 212. The face coating 210 has a face coating thickness $t_2$—as measured from the upper surface 211 to the lower surface 212 of the face coating 210. The face coating thickness $t_2$ may range from about 200 μm (micron) to about 500 μm—including all thicknesses and sub-ranges there-between. The lower surface 212 of the face coating 210 may be in direct contact with the upper surface 121 of the body 120. The upper surface 211 of the face coating 210 may form at least a portion of the first major surface 111 of the building panel 100 as discussed further herein.

Although not shown, the building panel 100 of the present invention may further comprise a non-woven scrim. The non-woven scrim may comprise an upper surface opposite a lower surface. The lower surface of the non-woven scrim may be positioned immediately, adjacent to and in direct contact with the upper surface 121 of the body 120. The face coating 210 may be applied to the non-woven scrim such that the lower surface 212 of the face coating 210 is in direct contact with the upper surface of the non-woven scrim.

The face coating 210 may comprise a first binder, a first pigment, and a first dispersant. The face coating 210, in the dry-state, may be present on the upper surface 121 of the body 120 in an amount ranging from about 26 g/m$^2$ to about 220 g/m$^2$—including all amounts and sub-ranges there-between. According to the present invention, the phrase "dry-state" indicates a composition that is substantially free of a liquid carrier (e.g., liquid water). Thus, the face coating 210 in the dry-state may comprise the first pigment, the first dispersant, the first binder, and less than about 0.1 wt. % of liquid carrier based on the total weight of the face coating 210. In a preferred embodiment, the fact coating 210 in the dry-state has a solid's content of about 100 wt. % based on the total weight of the face coating 210. Conversely, a composition that is in a "wet-state," which refers to a composition containing various amounts of liquid carrier—as discussed further herein.

The first binder may be present in the face coating 210 in an amount ranging from about 5 wt. % to about 20 wt. % based on the total dry-weight of the face coating 210 including all wt. % and sub-ranges there-between. The first binder may be polymeric. The first binder may have a glass transition temperature ("Tg") that is greater than room temperature ("Tm")—wherein room temperature ranges from about 21° C. to about 40° C.—including all temperatures and sub-ranges there-between. In some embodiments, the first binder may have an overall charge that is anionic.

Non-limiting examples of the first binder include polymers selected from polyvinyl alcohol (PVOH), latex, an acrylic polymer, polymaleic anhydride, or a combination of two or more thereof. Non-limiting examples of latex binder may include a homopolymer or copolymer formed from the following monomers: vinyl acetate (i.e., polyvinyl acetate), vinyl propinoate, vinyl butyrate, ethylene, vinyl chloride, vinylidene chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, and an ester. Preferably the binder is selected from the group consisting of aqueous lattices of polyvinyl acetate, polyvinyl acrylic, polyurethane, polyurethane acrylic, polystyrene acrylic, epoxy, polyethylene vinyl chloride, polyvinylidene chloride, and polyvinyl chloride.

The first dispersant may be present in the face coating 210 in an amount ranging from about 0.05 wt. % to about 2.0 wt. % based on the total dry-weight of the face coating 210—including all wt. % and sub-ranges there-between. The first dispersant may be ionic in nature—i.e., comprise one or more ionic groups such as anionic group or cationic group. In a preferred embodiment, the ionic group is anionic. The first dispersant may be polymeric having a molecular weigh (of at least 1,000 Mn. The first dispersant may comprise a hydrophilic portion and a hydrophobic portion—wherein the hydrophobic portion is used to attract to the first pigment while the first hydrophilic portion is used to disperse the attached pigment into the liquid carrier—i.e., water.

Figure 7:
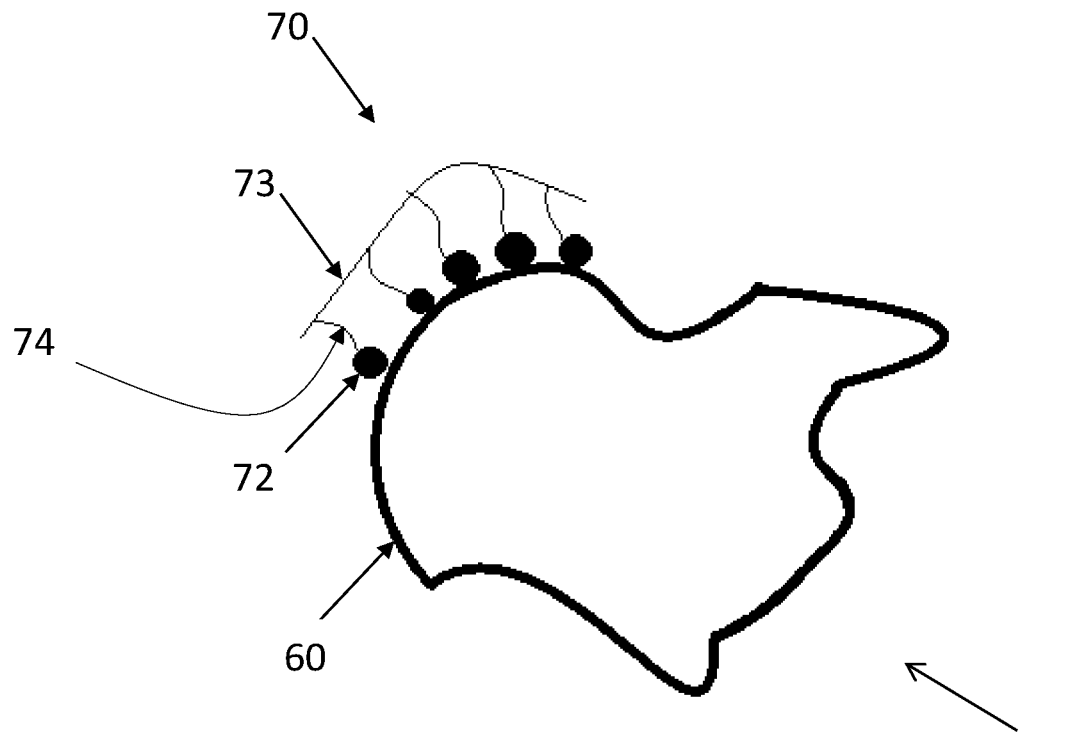
FIG. 7 is a first pigment treated with a first dispersant according to the present invention.

Referring now to FIG. 7, the present invention may comprise the first pigment 60 treated with the first dispersant 70, thereby forming a first dispersible pigment 50. As demonstrated by FIG. 7, the first dispersant 70 comprises a polymer backbone 73 and at least one pendant side-chain 74 that extends from the polymer backbone 73. The ionic group 72 of the first dispersant 70 may be located at the tip of the pendant side-chain 74. In a preferred embodiment, the first dispersant 70 comprises multiple pendant side-chains 74 each of which have an ionic group 72 located at the tip of the pendant side-chain 74.

The ionic group 72 is distanced from the polymer backbone 73 by a side-chain length as measured from the polymer backbone 73 to the tip or end of the pendant side-chain 74. The separation of the ionic group 72 from the polymer backbone 73 via the pendant side-chain 74 allows for a greater number of ionic groups 72 to be attached to a single dispersant (i.e., the first dispersant 70) because the ionic groups 72 are not forced apart by the steric hindrance of the polymer backbone 73 that normally results when ionic groups are located directly on the backbone of the polymer dispersant (for example, see FIG. 6 as discussed further herein). Less separation between ionic groups 72 on the first dispersant 70 results in a greater number of attachment points of the first dispersant 70 to the pigment 60, thereby provides a stronger attachment of the first dispersant 70 to the first pigment 60, thereby ensuring that the pigment is provided with the desired hydrophilicity imparted by the hydrophilic portion of the first dispersant 70.

Additionally, less separation of ionic groups 72 on the first dispersant 70 allows for better attachment of the first dispersant 70 to pigments having a smaller particle size—i.e., pigments having a particle size less than about 1 μm, preferably less than about 500 nm. The first pigment having smaller particles may have a particle size ranging from about 15 nm (nanometer) to about 400 nm (including all sizes and sub-ranges there-between)—because the greater density of ionic groups 72 on the first dispersant 70 can better accommodate the smaller volume occupied by each of the first pigments that would other not be possible with pigments having ionic groups attached directly to the polymer backbone of a dispersant because of the steric hindrance of the polymer backbone.

According to some embodiments, the dispersant may comprise an anionic polyacrylic polymer having a salt group formed from a neutralization of an acid group with a compound forming a cation. For examples, the polymer may comprise one or more pendant side chains comprising a terminal carboxylic acid group that is neutralized with sodium or ammonia to form a carboxylate anion and a sodium cation and/or ammonium cation. Alternatively, the polymer may comprise one or more pendant side chains comprising a terminal sulfonic acid group that is neutralized with the aforementioned sodium or ammonia compounds to form a salt group.

The first dispersant of the present invention may have a pH ranging from about 7.0 to about 8.0—including all pHs and sub-ranges there-between. In a preferred embodiment, the dispersant is an anionic polymer having a pH ranging from about 7 to about 8—including all pHs and sub-ranges there-between. The first dispersant may have a specific gravity (relative to water) that is less than 1. Specifically, the first dispersant may have a specific gravity (relative to water) ranging from about 0.8 to about 0.95—including all specific gravities and sub-ranges there-between. In a preferred embodiment, the first dispersant may have a specific gravity (relative to water) of about 0.95. The first dispersant may be commercially available as Zephrym™ PD 4974.

The first pigment may be present in the face coating 210 in an amount ranging from about 70 wt. % to about 95 wt. % including all wt. % and sub-ranges there-between—based on the total dry-weight of the face coating 210. Similar to the phrase "dry-state"—the phrase "dry-weight" refers to the weight of a component or composition without including any additional weight of liquid carrier. Thus, when calculating the dry weight of a component or composition, the calculation should be based solely on the weight of the solid components (e.g., dispersant, pigment, binder, etc.), and should exclude any amount of residual liquid carrier that may still be present from the wet-state.

The first pigment may be an inorganic pigment. The first pigment may be a particle exhibiting one of the previously discussed colors with respect to the color surface coating 200. Thus, the face coating 210 may also be referred to herein as a "color face coating" 210. Non-limiting examples of inorganic pigment include particles of carbon black, graphite, graphene, copper oxide, iron oxide, zinc oxide, calcium carbonate, manganese oxide, titanium dioxide and combinations thereof. The inorganic pigments may include individual particles having colors selected from, but not limited to, red, blue, yellow, black, green, brown, violet, white, grey and combinations thereof. The particles that make up the first pigment may have a particle size ranging from about 15 nm to about 1000 μm—including all sizes and sub-ranges there-between.

Previously, using such pigments to create face coatings required the face coatings to be applied using large amounts of carrier (i.e., low solids content during application of the coatings) and/or large amounts of other additives because such pigments will easily aggregate, thereby forming clumps that result in undesirable aesthetic properties in the resulting face coating. According to the present invention, however, face coatings using such pigments may be formed using high-solid's contents without risk of aggregating—as described further herein.

Creating the face coating 210 on the building panel 100 that exhibits the desired aesthetic qualities—i.e., a superior colored face on the building panel 100—is achieved by homogeneous distribution of the pigment within the face coating 210. When using the first pigment, which has a maximum particle size of about 1,000 μm, ensuring proper distribution of the pigment may be obtained by adding the first dispersant to the face coating 210. The dispersant may be polymeric and have an ionic charge.

According to some embodiments of the present invention, the first pigment may comprise carbon black, which exhibits a cationic charge, and the first dispersant may comprise anionic polyacrylic dispersant having a pH of about 7.5.

The face coating 210 may be formed by applying a face coating composition in the wet-state. The face coating composition may comprise the first pigment, the first dispersant, and the first binder, as well as a liquid carrier. The liquid carrier may be selected from water, VOC solvent—such as acetone, toluene, methyl acetate—or combinations thereof. In a preferred embodiment, the liquid carrier is water and comprises less than 1 wt. % of VOC solvent based on the total weight of the liquid carrier.

The face coating composition has a high-solid's content. According to the present invention, the term "high solids content" refers to a solids content of at least 45 wt. % based on the total weight of the face coating composition. Stated otherwise, the liquid carrier is present in a maximum amount of about 55 wt. % based on the total weight of the face coating composition.

The solids content of the face coating composition may range from about 45 wt. % to about 70 wt. %—including all wt. % and sub-ranges there-between. In a preferred embodiment, the solids content of the face coating composition may range from about 45 wt. % to about 65 wt. % based on the total weight of the face coating composition—including all wt. % and sub-ranges there-between. In some embodiments, the face coating composition may have a solids content of at least 50 wt. % based on the total weight of the face coating composition. In some embodiments, the face coating composition may have a solids content of at least 60 wt. % based on the total weight of the face coating composition.

The solid's content is calculated as the fraction of materials present in the face coating composition that are not the liquid carrier. Specifically, the solid's content of the face coating composition may be calculated as the amount of dispersant, pigment, and binder in the face coating composition and dividing it by the total weight of the face coating composition (including liquid carrier).

Therefore, the amount of each component in the face coating composition may be calculated by multiplying the desired amount of each of the first dispersant, the first pigment, and the first binder present in the face coating 210 in the dry-state by the total solids content of the face coating composition. For example, for a face coating 210 in the dry-state comprising about 60 wt. % of pigment, whereby that face coating 210 is formed from a face coating composition having a solids content of 70 wt. %—the amount of the first pigment in the face coating composition would be 42 wt. % based on the total weight of the face coating composition in the wet-state—i.e., 60 wt. %×0.7=42 wt. % of pigment in the face coating composition.

The face coating composition may have a viscosity ranging from about 250 cps to about 2,500 cps as measured by a Brookfield viscometer at 10 RPM using a #4 spindle at room temperature—including all viscosities and sub-ranges there-between. In a preferred embodiment, the face coating composition may have a viscosity ranging from about 350 cps to about 1,500 cps as measured by a Brookfield viscometer at 10 RPM using a #4 spindle at room temperature—including all viscosities and sub-ranges there-between. The face coating composition may have a viscosity ranging from about 350 cps to about 750 cps as measured by a Brookfield viscometer at 10 RPM using a #4 spindle at room temperature—including all viscosities and sub-ranges there-between. The face coating composition may exhibit a cationic charge.

The face coating composition (i.e., in the wet-state) may be applied to the upper surface 121 of the body 120 in an amount ranging from about 26 g/m² to about 220 g/m²—including all sub-ranges and values there-between. The face coating composition may be applied to the upper surface 121 by roll coating, brush coating, and spray coating, and/or curtain blade.

Adding the first dispersant to the first coating composition of the present invention allows for not only the first pigment to have a maximum particle size of about 1000 μm, but also allows for the first coating composition to have the aforementioned high solid's content without risk of causing the first pigment to aggregate. The high solid's content provides for faster application and drying of face coating composition into the face coating 210. Specifically, after application to the body 120, the face coating composition is dried, thereby driving off the liquid carrier thereby creating the face coating 210, which as previously discussed is in the dry-state.

Specifically, the face liquid-based coating composition may be dried in a conventional oven at a first elevated temperature for a first drying period. The first elevated temperature may range from about 67° C. to about 232° C.—including all sub-ranges and temperature there-between. In some embodiments, the first elevated temperature may range from about 67° C. to about 190° C.—including all sub-ranges and temperature there-between. In some embodiments, the first elevated temperature may range from about 93° C. to about 232° C.—including all sub-ranges and temperature there-between.

The first drying period may range from about 10 seconds to about 120 seconds—including all sub-ranges and temperature there-between. The resulting face coating 210 may be present on the upper surface 121 of the body 120 in an amount ranging from about 10 g/m² to about 132 g/m²—including all amounts and sub-ranges there-between.

Referring now to FIGS. 1 and 4, the resulting building panel 100 may comprise the face coating 210—whereby the first major surface 111 of the building panel 100 comprises the upper surface 211 of the face coating 210. Thus, in the installed state, at least a portion of the upper surface 211 of the face coating 210 faces the active room environment 2. The face coating 210 may be substantially continuous. The term "substantially continuous" means less than 5% of the available surface area on the referenced surface contains pin-holing or blistering.

According to other embodiments, the building panel 100 may comprise a surface coating 200 applied to the side surface 123 of the body 120 to form an edge coating 230. The edge coating 230 may comprise one or more of the previously discussed color pigments. Thus, the edge coating 230 may also be referred to herein as a color edge coating 230.

The edge coating 230 may comprise an outer surface 231 opposite an inner surface 232. The edge coating 230 has an edge coating thickness $t_3$ was measured from the outer surface 231 to the inner surface 232 of the edge coating 210. The edge coating thickness $t_3$ may range from about 100 μm to about 600 μm—including all thicknesses and sub-ranges there-between. In a preferred embodiment, the edge coating thickness $t_3$ may range from about 200 μm to about 500 μm—including all thicknesses and sub-ranges there-between. The edge coating 230 (i.e., in the dry-state) may be present in an amount ranging from about 7.5 g/m² to about 150 g/m²—including all amounts and sub-ranges there-between.

The edge coating 230 may comprise a second pigment, a second dispersant, and a second binder. The second binder may be present in an amount ranging from about 1 wt. % to about 50 wt. % based on the total dry-weight of the edge coating 230—including all amounts and sub-ranges there-between. The second binder may be thixotropic. The term "thixotropic" refers to a composition that has a high viscosity (e.g., 40,000 cps) at low-shear and a low viscosity (e.g., 800 cps) at high-shear. Non-limiting examples of thixotropic binder include polymers selected from polyvinyl alcohol (PVOH), aforementioned latex, acrylic polymer, polymaleic anhydride, or a combination of two or more thereof.

The second binder may be a thixotropic polymeric having a Tg that is less than room temperature ("Tm"). In a preferred embodiment, the second binder is a thixotropic polymeric binder having a Tg less than 20° C.—preferably less than 19° C. The binder may be film-forming and having a minimum film-forming temperature of about 12° C. The term "film-forming temperature" refers to the temperature at which a composition forms a film.

The second pigment may be present in an amount ranging from about 1 wt. % to about 95 wt. % based on the total dry-weight of the edge coating 230—including all wt. % and sub-ranges there-between. The second pigment may be present in an amount ranging from about 1 wt. % to about 80 wt. % based on the total dry-weight of the edge coating 230—including all wt. % and sub-ranges there-between. The second pigment may be present in an amount ranging from about 30 wt. % to about 80 wt. % based on the total dry-weight of the edge coating 230—including all wt. % and sub-ranges there-between.

The second pigment may comprise one of the pigments previously listed as being suitable for the first pigment. In other embodiments, the second pigment may comprise one or more white pigments having a particle size ranging from about 0.1 μm to about 1000 μm—including all sizes and sub-ranges there-between. In some embodiments, the second pigment may comprise one or more white pigments having a particle size ranging from about 0.1 μm to about 250 μm—including all sizes and sub-ranges there-between.

The second dispersant may be present in an amount ranging from about 0.01 wt. % to about 2.0 wt. % based on the total dry-weight of the edge coating 230—including all wt. % and sub-ranges there-between. Like the first dispersant, the second dispersant may comprise a hydrophilic portion and a hydrophobic portion.

When the second pigment has a particle size in the same range as disclosed for the smaller first pigment, the second dispersant may comprise one or more compounds listed as being suitable for the first dispersant.

Figure 6:
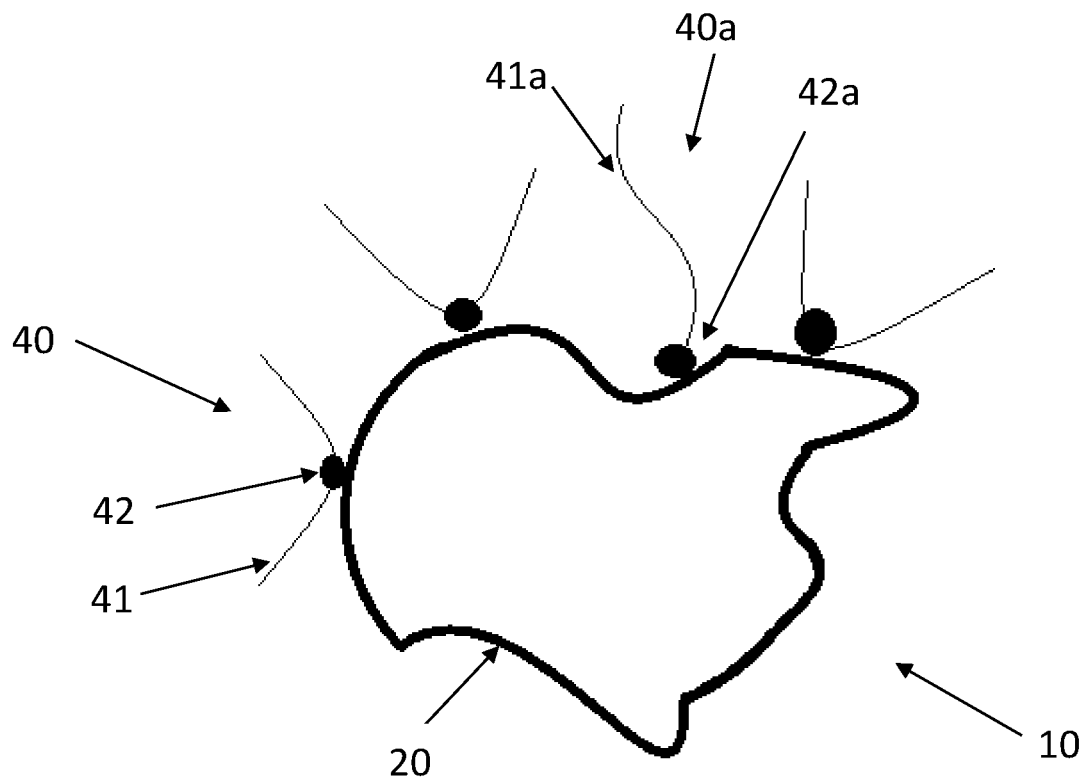
FIG. 6 is a second pigment treated with a second dispersant according to the present invention.

Referring now to FIG. 6, when the second pigment 20 has a particle size ranging from about 0.1 μm to about 250 μm, the second dispersant 40 may comprise anionic polyacrylic dispersants wherein the ionic group 41 is located directly on the polymer backbone 41 of the second dispersant 40. Together, the second pigment 20 and the second dispersant 40 form a second dispersible pigment 10.

The edge coating 230 may be formed by applying an edge coating composition having a solids content ranging from about 65 wt. % to about 80 wt. %—including all amounts and sub-ranges there-between. The edge coating composition may be thixotropic. The edge coating composition may be thixotropic. The edge coating composition may have a viscosity ranging from about 6,000 cps to about 10,000 cps as measured by a Brookfield viscometer at 10 RPM using a #4 spindle at room temperature—including all viscosities and sub-ranges there-between. The edge liquid-based coating composition may comprise water as the liquid carrier, wherein the liquid carrier comprises less than 1 wt. % of VOC solvent.

The edge coating composition may be applied to the body side surface 123 in an amount ranging from about 10 g/m² to about 200 g/m²—including all sub-ranges and values there-between. The edge coating composition may be applied to the side surface 123 of the body 120 by spray, roll, wheel coater, and vacuum coating.

The edge coating composition may be dried at an elevated temperature for a drying period—wherein the elevated temperature ranges from about 120° C. to about 240° C.—including all sub-ranges and temperature there-between. The drying period may range from about 10 seconds to about 120 seconds—including all sub-ranges and temperature there-between. The resulting edge coating 230 (i.e., in the dry-state) may be present in an amount ranging from about 7.5 g/m² to about 150 g/m²—including all amounts and sub-ranges there-between.

According to the embodiments where the building panel 100 comprises the edge coating 230, the side surface 113 of the building panel 100 may comprise the edge coating 230. Specifically, the side surface 113 of the building panel 100 may comprise the outer surface 231 of the edge coating 230. Thus, the outer surface 231 of the edge coating 230 may for the upper portion 113a and the lower portion 113b of the side surface 113 of the building panel 100. Specifically, the upper portion 113a of the side surface 113 may comprise an upper edge coating portion 231a and the lower portion 113b of the side surface 113 may comprise a lower edge coating portion 231b.

Although not pictured, some embodiments of the present invention include a building panel comprising a surface coating 200 comprising only the edge coating 230. Specifically, the building panel 100 may comprise a first major surface opposite a second major surface and a side surface extending there-between. The side surface 113 of the building panel 100 may comprise the edge coating 230, the first major surface 111 of the building panel 100 may comprise the upper surface 121 of the body 120 and the second major surface 112 of the building panel 100 may comprise the lower surface 122 of the body 120.

Although not pictured, some embodiments of the present invention include a building panel comprising a surface coating 200, wherein the surface coating 200 comprises only the face coating 210. Specifically, the building panel 100 may comprise a first major surface 111 opposite a second major surface 112 and a side surface 113 extending there-between. The first major surface 111 of the building panel 100 may comprise the upper surface 211 of the face coating 210, the second major surface 112 of the building panel 100 may comprise the lower surface 122 of the body 120, and the side surface 113 of the building panel 100 may comprise the body side surface 123.

Referring now to FIG. 4, building panels 300, 400, 500 are illustrated in accordance with other embodiments of the present invention. The building panels 300, 400, and 500 are similar to building panel 100 except as described herein below. The description of building panel 100 above generally applies to building panels 300, 400, and 500 described below except with regard to the differences specifically noted below. A similar numbering scheme will be used for the building panels 300, 400, and 500 as with building panel 100 except that the 300-, 400-, and 500-series of numbers will be used.

Figure 5:
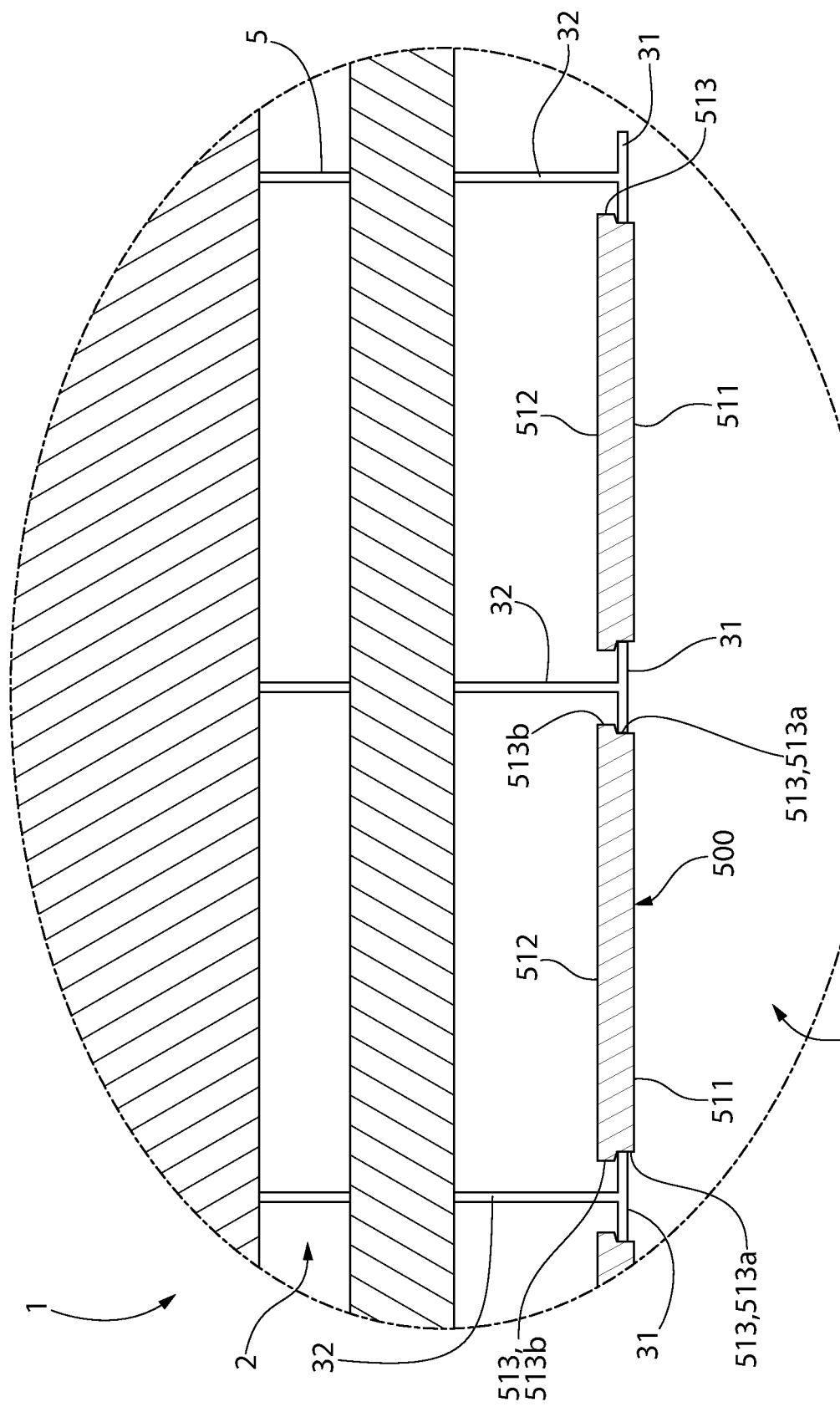
FIG. 5 is a close-up view of a ceiling system comprising the coated building panel according to an alternative embodiment of the present invention, the close-up view being the portion identified by oval V in FIG. 3.

Referring now to FIG. 5, the building panel 500 may be installed according to the second variation, as described herein. The building panel 500 may be positioned such that the upper portion 513a of the side surface 513 is below the horizontal flange 31, thereby extending into the active room environment 2. In the second variation, the lower portion 513b of the side surface 513 is above the horizontal flange 31 extending into the plenum space 3. In the second variation, the first major surface 511 and the upper portion 513a of the side surface 513 of the building panel 500 is exposed to the active room environment 2. In the second variation, the lower portion 513b of the side surface 513 may be concealed from the active room environment 2. The lower portion 513b of the side surface 513 may be adjacent to at least a portion of the vertical web 32 as viewed along a horizontal direction. The lower portion 513b of the side surface 513 as well as the second major surface 512 may be exposed to the plenum space 3.

According to these embodiments, the upper portion 513*a* and the lower portion 513*b* may comprise the surface coating 200—specifically, the first face coating 210. According to these embodiments, the first major surface 511 may comprise the surface coating 200—specifically, the edge coating 230. Therefore, the surface coating 200 may be exposed to the active room environment on the first major surface 511 and the upper portion 513*a* of the side surface 513 of the building panel 500 in the installed state.

The invention will be described in greater detail by way of specific examples. The following examples are offered for illustrative purposes and are not intended to limit the invention in any manner.

EXAMPLES

Experiment 1

The following experiment is directed to a high solids color coating composition of the present invention that may be used to form a coating with superior aesthetic properties. Coating compositions were prepared according to the following formulations set forth in Table 1:

TABLE 1

| Amount (g) | Comp. Ex. 1 | Ex. 1 | Ex. 2 | Ex. 3 | Ex. 4 |
|---|---|---|---|---|---|
| Water | 26.53 | 26.53 | 26.53 | 33.34 | 66.18 |
| Binder | 12.44 | 12.44 | 12.44 | 12.44 | 24.88 |
| Pigment 1 | 55.0 | 55.0 | 55.0 | 38.19 | 76.38 |
| Pigment 2 | — | — | — | 10 | 20.0 |
| Pigment 3 | 5.45 | 5.45 | 5.45 | 5.45 | 10.9 |
| First Dispersant | — | 0.3 | 0.3 | 0.3 | 0.6 |
| Thickener | — | — | — | — | 0.5 |
| Additive | 0.26 | 0.26 | 0.28 | 0.28 | 0.56 |
| Total | 100 | 100 | 100 | 100 | 200 |
| Total Solids | 67.7 | 66.67 | 66.67 | 59.91 | 119.92 |
| % Solid | 67.7% | 66.67% | 66.67% | 59.91% | 59.96% |
| Pigment/Binder | 4.86 | 4.86 | 4.86 | 4.31 | 4.31 |
| pH | 8.4 | 7.9 | 8.1 | 7.8 | 7.7 |

The binder is carboxylated polyvinyl acetate homopolymer. Pigment 1 is calcium carbonate having a particle size of about 12 μm. Pigment 2 is kaolin having a particle size of about 2 μm. Pigment 3 is calcined diatomaceous earth having a particle size of about 18 μm.

The first dispersant is an anionic polymer dispersant having pendant side-chains extending from a polymer backbone wherein the anionic groups are located on the terminal ends of the pendant side-chains. The first dispersant comprises the anionic polymer dispersed in water at a solids content ranging from about 30 wt. % to about 34 wt. %. The additive includes a mixture of defoamer and biocide. The thickener includes hydroxyethylcellulose.

Each component (e.g., Pigments 1-3, first dispersant, binder, etc.) may be provided as a solid or as a pre-made mixture with water in various solids content. Thus, to account for some of the coating composition components being pre-mixed with water, the total solids content of the overall coating composition in water is provided.

The viscosity of each of the coating compositions of Examples 1-4 as well as Comparative Example 1 were then measured using a Brookfield viscometer as various RPMs. The composition of each example was also allowed to sit for various periods of time—after which the stability of each composition was observed in the form of hard-packing, which refers to the presence of agglomeration of the pigments into hard packs (as compared to a uniform dispersion of the individual pigments throughout the carrier). The results are set forth in Table 2.

TABLE 2

| | Comp. Ex. 1 | Ex. 1 | Ex. 2 | Ex. 3 | Ex. 4 |
|---|---|---|---|---|---|
| % Solid | 67.7% | 66.67% | 66.67% | 59.91% | 59.96% |
| Viscosity (cps) | Comp. Ex. 1 | Ex. 1 | Ex. 2 | Ex. 3 | Ex. 4 |
| 10 rpm | — | 40.0 | — | 160.0 | 1,240 |
| 12 rpm | 83.3 | 93.3 | 83.3 | 83.3 | — |
| 60 rpm | 50.0 | 50.0 | 33.3 | 50.0 | 380 |
| Stability (Hard Packing) | Comp. Ex. 1 | Ex. 1 | Ex. 2 | Ex. 3 | Ex. 4 |
| 6 hours | Yes | — | — | No | No |
| 48 hours | Yes | — | — | No | No |

As demonstrated by Table 2, the coating composition of the present invention provides the desired viscosity while also providing superior stability of the pigments within the coating composition over time. Superior stability of the pigment in the coating composition translates to better color distribution in the resulting coating formed from the coating composition. As a result, coating compositions having higher solids contents can be achieved without sacrificing the desired aesthetic properties of the resulting coating.

Experiment 2

The following experiment is directed to a high solids coating composition of the present invention that may be used to form a coating with superior aesthetic properties when using pigments having a particle size ranging from about 15 nm to about 1,000 μm. Coating compositions were prepared according to the following formulations set forth in Table 3:

TABLE 3

| Amount (g) | Ex. 5 | Comp. Ex. 2 |
|---|---|---|
| Water | 744.53 | 1047.47 |
| Binder | 279.9 | 205.18 |
| Pigment 1 | 859.27 | — |
| Pigment 2 | 225 | 885.49 |
| Pigment 3 | 122.62 | 97.18 |
| First Dispersant | 6.75 | — |
| Second Dispersant | — | 1.73 |
| Thickener | 0.0 | 2.59 |
| Additive | 11.93 | 39.59 |
| Total | 2250 | 2279.17 |
| % Solid | 60.9 | 37.22 |
| Pigment/Binder | 4.86 | 4.86 |
| pH | 7.5 | 8.2 |

The binder is carboxylated polyvinyl acetate homopolymer. Pigment 1 is calcium carbonate having a particle size of about 12 μm. Pigment 2 is kaolin having a particle size of about 2 μm. Pigment 3 is calcined diatomaceous earth having a particle size of about 18 μm.

The first dispersant is an anionic polymer dispersant having pendant side-chains extending from a polymer backbone wherein the anionic groups are located on the terminal ends of the pendant side-chains. The first dispersant liquid has a solids content ranging from about 30 wt. % to about 34 wt. % and comprises water as a carrier. The second dispersant is an anionic dispersant having anionic groups attached directly to the polymeric backbone and no pendant side-chains. The second dispersant liquid has a solids content of about 45 wt. % and comprises water as a carrier. The additive includes a mixture of defoamer, wetting agent, and biocide/antimicrobial agents. The thickener includes hydroxyethylcellulose.

Each component (e.g., Pigments 1-3, first dispersant, second dispersant, etc.) may be provided as a solid or as a pre-made mixture with water in various solids content. Thus, to account for some of the coating composition components being pre-mixed with water, the total solids content of the overall coating composition in water is provided.

The viscosity of each of the coating compositions of Example 5 and Comparative Example 2 were then measured using a Brookfield viscometer as various RPMs. The results are set forth in Table 4.

TABLE 4

|  | Ex. 5 | Comp. Ex. 2 |
|---|---|---|
| % Solid | 60.9 | 37.22 |
| Viscosity (cps) | Ex. 5 | Comp. Ex. 2 |
| 0.5 rpm | 20,800 | 36,800 |
| 10 rpm | 1,800 | 2,320 |
| 60 rpm | 440 | 553.3 |
| 100 rpm | 340 | 8.24 |
| Drawdown ΔE | Ex. 5 | Comp. Ex. 2 |
| Dark Section | — |  |
| Light Section | — |  |

As demonstrated by Table 4, the coating composition of the present invention provides the desired viscosity at much higher solids contends as compared to other anionic dispersants having the ionic group present directly on the polymer backbone.

Additionally, the enhanced dispersion of the pigments using the dispersant of the present invention is reflected in the superior drawdown color values. The drawdown color evaluations of each sample were measured and compared against each other. The color evaluations were performed by measured for a change in color value—i.e. "Delta E" (Δ E). Delta E value is measured by the following calculation:

$$\Delta E=[(L_2-L_1)^2+(a_2-a_1)^2+(b_2-b_1)^2]^{1/2}$$

wherein $L_1$, $a_1$, and $b_1$ are color values of Comp. Ex. 2, measured using a Minolta Chroma Meter CR 410 from Minolta Corporation. The $L_2$, $a_2$, and $b_2$ values are the color values of Ex. 5 as measured by the Minolta Chroma Meter CR 410. The color values are shown in Table 5.

TABLE 5

| Dark Section | Ex. 5 | Comp. Ex. 2 | Light Section | Ex. 5 | Comp. Ex. 2 |
|---|---|---|---|---|---|
| L | 91.03 | 89.47 | L | 93.11 | 91.29 |
| a | −0.95 | −1.17 | A | −0.27 | 0.44 |
| b | 4.85 | 5.79 | b | 7.88 | 8.29 |
| ΔL | 1.56 | — | ΔL | 1.82 | — |
| Δa | 0.23 | — | Δa | −0.71 | — |
| Δb | 0.88 | — | Δb | −0.41 | — |
| ΔE | 1.806 | — | ΔE | 2 | — |

As demonstrated by Table 5, the coating formed from the coating of Example 5 exhibits superior color values demonstrated by the ΔE being greater than 0. Additionally, the enhanced dispersion of the pigments using the dispersant of the present invention is reflected in the superior gloss values. The gloss values are shown in Table 6.

TABLE 6

| Gloss | Ex. 5 | Comp. Ex. 2 |
|---|---|---|
| 20° | 0 | 0.3 |
| 60° | 0.4 | 3.4 |
| 85° | 0.9 | 5.6 |

As demonstrated by Table 6, the enhanced pigment dispersion of Example 5 (as compared to Comparative Example 2) creates a better colored face coating that absorbs more incident light, thereby providing a less gloss surface and providing superior color appearance.

Experiment 3

The following experiment is directed to a high solids coating composition of the present invention that may be used to form a coating with superior aesthetic properties when using pigments having a particle size ranging from about 15 nm to about 1000 μm. Coating compositions were prepared according to the following formulations set forth in Table 7:

TABLE 7

| Amount (g) | Ex. 6 | Comp. Ex. 3 |
|---|---|---|
| Water | 302.4 | 410.1 |
| Binder | 113.5 | 80.5 |
| Pigment 1 | 349.0 | — |
| Pigment 2 | 91.4 | 347.3 |
| Pigment 3 | 49.8 | 38.1 |
| Pigment 4 | 86.0 | 105 |
| First Dispersant | 2.74 | — |
| Second Dispersant | — | 0.68 |
| Thickener | 2.28 | — |
| Additive | 4.85 | 16.51 |
| Total | 1002 | 998.2 |
| % Solid | 59.76 | 38.37 |

The binder is carboxylated polyvinyl acetate homopolymer. Pigment 1 includes calcium carbonate having a particle size of about 12 μm. Pigment 2 includes kaolin having a particle size of about 2 μm. Pigment 3 includes calcined diatomaceous earth having a particle size of about 18 μm. Pigment 4 includes carbon black having a particle size less than about 1 μm.

The first dispersant is an anionic polymer dispersant having pendant side-chains extending from a polymer backbone wherein the anionic groups are located on the terminal ends of the pendant side-chains. The first dispersant liquid has a solids content ranging from about 30 wt. % to about 34 wt. % and comprises water as a carrier. The second dispersant is an anionic dispersant having anionic groups attached directly to the polymeric backbone and no pendant side-chains. The second dispersant liquid has a solids content of about 45 wt. % and comprises water as a carrier. The additive includes a mixture of defoamer, wetting agent, and biocide/antimicrobial agents. The thickener includes hydroxyethylcellulose.

Each component (e.g., Pigments 1-4, first dispersant, second dispersant, etc.) may be provided as a solid or as a pre-made mixture with water in various solids content. Thus, to account for some of the coating composition components being pre-mixed with water, the total solids content of the overall coating composition in water is provided.

Two sets of viscosity measurements were performed on the compositions of Example 6 and Comparative Example 3. The first set of viscosity measurements were performed immediately after the respective compositions were formed. Each sample was then allowed to sit undisturbed for a period of 24 hours, whereby the viscosity of each sample was then subjected to another viscosity test using a Brookfield viscometer as various RPMs. The drawdown color evaluations of each sample were also measured and compared against each other. The results are set forth in Table 8.

TABLE 8

|  | Ex. 6 | Comp. Ex. 3 |
|---|---|---|
| % Solid | 38.37 | 59.76 |
| Initial Viscosity (cps) | Ex. 6 | Comp. Ex. 3 |
| 0.5 rpm | 5,600 | 21,600 |
| 10 rpm | 1,000 | 2,040 |
| 60 rpm | 300 | 480 |
| 100 rpm | 236 | 292 |
| Viscosity (cps) after 24 hours | Ex. 6 | Comp. Ex. 3 |
| 0.5 rpm | 7,000 | 67,200 |
| 10 rpm | 1,000 | 4,520 |
| 60 rpm | 320 | 1040 |
| 100 rpm | 248 | 600 |

As demonstrated by Table 8, the coating composition of the present invention provides the desired viscosity stability over time at much higher solids contends as compared to other anionic dispersants having the ionic group present directly on the polymer backbone.

Additionally, the enhanced dispersion of the pigments using the dispersant of the present invention is reflected in the superior drawdown color values. The drawdown color evaluations of each sample were measured and compared against each other. The color evaluations were performed by measured for a change in color value—i.e. "Delta E" ($\Delta E$)—wherein $L_1$, $a_1$, and $b_1$ are color values of Comp. Ex. 2, measured using a Minolta Chroma Meter CR 410 from Minolta Corporation. The $L_2$, $a_2$, and $b_2$ values are the color values of Ex. 5 as measured by the Minolta Chroma Meter CR 410. The color values are shown in Table 9.

TABLE 9

| Color Measurements | Ex. 6 | Comp. Ex. 3 |
|---|---|---|
| L | 20.81 | 28.97 |
| a | 0.12 | -0.29 |
| b | -0.56 | -2.54 |
| $\Delta L$ | -8.29 | — |
| $\Delta a$ | 0.41 | — |
| $\Delta b$ | 1.98 | — |
| $\Delta E$ | 4.5 | — |

As demonstrated by Table 9, the coating formed from the coating of Example 6 exhibits a change in color values demonstrated by the $\Delta E$ being greater than 0. Additionally, the enhanced dispersion of the pigments using the dispersant of the present invention is reflected in the superior gloss values. The gloss values are shown in Table 10.

TABLE 10

| Gloss | Ex. 6 | Comp. Ex. 3 |
|---|---|---|
| 20° | 1.2 | 1.3 |
| 60° | 2.2 | 3.9 |
| 85° | 1.0 | 4.2 |

As demonstrated by Table 10, the enhanced pigment dispersion of Example 6 (as compared to Comparative Example 3) creates a better colored face coating that absorbs more incident light, thereby providing a less gloss surface and providing superior color appearance.

As those skilled in the art will appreciate, numerous changes and modifications may be made to the embodiments described herein, without departing from the spirit of the invention. It is intended that all such variations fall within the scope of the invention.

What is claimed is:

1. A coated building panel comprising:
   a body comprising an upper surface opposite a lower surface and a side surface extending between the upper surface and the lower surface;
   a surface coating atop the upper surface, the surface coating comprising:
   inorganic pigment;
   a binder comprising carboxylated polyvinyl acetate homopolymer; and
   an anionic polymeric dispersant comprising a polymer backbone and pendant side chains extending from the polymer backbone;
   wherein anionic groups are located on the terminal ends of the pendant side-chains; and
   wherein the surface coating comprises a liquid carrier in an amount less than about 1 wt. % based on the total weight of the surface coating.

2. The coated building panel according to claim 1, wherein the polymeric dispersant comprises a hydrophobic portion and a hydrophilic portion.

3. The coated building panel according to claim 1, wherein the polymeric dispersant has a molecular weight of at least 1,000 Mn.

4. The coated building panel according to claim 1, wherein the polymeric dispersant is present in an amount ranging from about 0.05 wt. % to about 2.0 wt. % based on the total weight of the surface coating.

5. The coated building panel according to claim 1, wherein the inorganic pigment has a particle size ranging from about 15 nm to about 1,000 µm.

6. The coating building panel according to claim 5, wherein the inorganic pigment has a maximum particle size of about 500 nm.

7. The coated building panel according to claim 1, wherein the surface coating is present in an amount ranging from about 10 g/m² to about 132 g/m².

8. The coated building panel according to claim 1, wherein the inorganic pigment is present in an amount ranging from about 70 wt. % to about 95 wt. % based on the total weight of the surface coating.

9. The coated building panel according to claim 1, wherein the binder has a glass transition temperature greater than about 21° C.

10. The coated building panel according to claim 1, wherein the binder is present in an amount ranging from about 5 wt. % to about 20 wt. % based on the total weight of the surface coating.

11. The coated building panel according to claim 1, wherein the anionic polyacrylic polymer comprises a salt group formed from a neutralization of an acid group with a compound forming a cation.

12. A coated building panel comprising:
- a body comprising an upper surface opposite a lower surface and a side surface extending between the upper surface and the lower surface;
- a surface coating atop the upper surface, the surface coating comprising:
  - about 70 wt. % to about 95 wt. % of a pigment blend based on the total weight of the surface coating, the pigment blend comprising two or more inorganic pigments having a particle size ranging from 15 nm to 500 nm;
  - a binder comprising carboxylated polyvinyl acetate homopolymer; and
  - an anionic polymeric dispersant comprising a polymer backbone and pendant side chains extending from the polymer backbone;
- wherein anionic groups are located on the terminal ends of the pendant side-chains;
- wherein the anionic polymeric dispersant comprises a hydrophobic portion and a hydrophilic portion;
- wherein the pigment blend comprises calcium carbonate and calcined diatomaceous earth; and
- wherein the surface coating comprises less than 1 wt. % of a liquid carrier based on the total weight of the surface coating.

13. The coated building panel according to claim 12, wherein the anionic polyacrylic dispersant comprises a salt group formed from a neutralization of an acid group with a compound forming a cation.

14. The coated building panel according to claim 12, further comprising a thickener.

15. The coated building panel according to claim 14, wherein the thickener comprises hydroxyethylcellulose.

16. The coated building panel according to claim 12, wherein the pigment blend comprises a first pigment, a second pigment that is different than the first pigment, and a third pigment that is different than the first pigment and the second pigment.

17. The coated building panel according to claim 12, wherein the pigment blend comprises kaolin.

* * * * *